United States Patent [19]

Snell et al.

[11] Patent Number: 4,556,016
[45] Date of Patent: Dec. 3, 1985

[54] LIFTING DEVICES

[76] Inventors: Thomas B. Snell, Hillview, Penn La., Hardington Mandeville, Somerset; Peter S. Kerton, Higher Farm, Chilton Cantelo, Yeovil, Somerset, both of England

[21] Appl. No.: 503,198
[22] PCT Filed: Sep. 20, 1982
[86] PCT No.: PCT/GB82/00274
 § 371 Date: May 19, 1983
 § 102(e) Date: May 19, 1983
[87] PCT Pub. No.: WO83/00982
 PCT Pub. Date: Mar. 31, 1983

[30] Foreign Application Priority Data

Sep. 19, 1981 [GB] United Kingdom ............... 8128368
Oct. 14, 1981 [GB] United Kingdom ............... 8130986
Nov. 30, 1981 [GB] United Kingdom ............... 8136023
Mar. 3, 1982 [GB] United Kingdom ............... 8206140
Apr. 29, 1982 [GB] United Kingdom ............... 8212416

[51] Int. Cl.⁴ ............................................. A61D 3/00
[52] U.S. Cl. ..................................... 119/102; 119/103
[58] Field of Search ..................... 119/102, 103, 98; 5/449, 455

[56] References Cited

U.S. PATENT DOCUMENTS 3,621,819 11/1971 Hooper .............................. 119/102
4,070,989 1/1978 Ganzel ........................... 119/102 X
4,184,451 1/1980 Carlin ................................ 119/103
4,185,591 1/1980 Patelis ................................. 119/98

FOREIGN PATENT DOCUMENTS 491786 10/1976 Australia .

Primary Examiner—Hugh R. Chamblee
Attorney, Agent, or Firm—Young & Thompson

[57] ABSTRACT

A lifting device for animals, such as downer cows, has an inflatable bag (1) on a stabilizing frame (2). When inflated, the bag has a valley (4), accentuated at one end, for the cow's belly and udder. A harness (3) is provided for strapping the cow to the bag. A cow can be rolled on to the deflated bag and strapped on, and as inflation proceeds she is raised up straddling the bag. This ultimately takes her entire weight while circulation is restored. The bag may be compartmented so that inflation can be progressive from one compartment to the next, assisting the lifting procedure.

27 Claims, 10 Drawing Figures

LIFTING DEVICES

This invention relates to lifting devices for animals. It is primarily intended to alleviate the problem of the downer cow, although it could have other bovine, equine, or general veterinary applications. In this specification it will be discussed in terms of lifting cows.

After calving, cows are sometimes unable to muster sufficient strength to get to their feet, and in this weakened state they are commonly referred to as downer cows. Certain ailments such as milk fever may have similar effects. If the cow does not get up within a period of about say six hours there is a restriction of the blood circulation, particularly in the legs, and other detrimental physical conditions develop. Before these go too far, it becomes imperative to help the cow stand up. If she does not, she will probably die.

Certain rather crude mechanical aids have been used, such as a clamp which is locked onto the cow's buttocks and then hauled up by a block and tackle. Even fork lifts on the front of a tractor have been used in emergencies. However, these methods are clumsy and potentially and sometimes actually very damaging to the animal.

The aim of the invention is therefore to provide a more gentle lifting device, and moreover one which not only raises the animal to a standing position, but also helps to keep it there while recovery takes place, and is then operable to lower it gradually to take its full weight on its feet. It is also desirable that the device should be very compact and easy to install and operate in a fairly confined space. While not every farmer may need one, it should be equipment practical for a vet to carry in his car.

According to one aspect of the present invention there is provided a lifting device for animals comprising an inflatable bag, means for stabilising the bag as it inflates with a load on top, and restraining means for holding an animal straddling the bag.

In the preferred form, the bag is of generally rectangular block-like form with a depression along its upper side for the animal's belly. As mentioned above, the device is primarily intended for downer cows and so one end of this depression will generally be accentuated to accommodate a cow's udder.

Internally, the bag may have a dividing membrane aligned with the length of the depression, which will exert a downward pull when the bag is inflated to help create that depression. The accentuated part for the udder may be formed by further internal membranes. There will also preferably be internal ties acting generally horizontally to restrain the ends of the bag from bulging. This makes for some freedom for the animal's legs, which might be unduly restricted if the bag was allowed to bulge outwardly.

The stabilising means may take the form of a rigid frame securable to the underside of the bag. Conveniently, it comprises a plurality of elements which fit together and which can be removed for deflation and stowage of the bag. Preferably, it has radial spokes with a common hub with which the spokes engage. This hub may be attached to the bag at the centre of the base, and the spokes may pass through at or near the periphery of the base. With a block-like bag, it is convenient to have just four spokes in the form of a cross, with the eyes at the bottom corners of the bag.

The restraining means will generally include a strap for fastening over the animal's back when straddling the bag. There may also be a strap for fastening round the animal's fore or hind legs. That would be primarily for preventing the animal trying to walk while straddling the bag. The restraining means may go to common anchorage points at opposite sides of the bag and preferably there will be reinforcements which will also extend to zones where the frame is secured. These reinforcements may be inverted V-shaped straps bonded to or incorporated in opposite sides of the bag, the anchorage points being at the apices.

According to another aspect of the present invention there is provided a method of raising an animal from a lying down position comprising arranging the device as defined above in a deflated condition on the ground near the animal, manoeuvring the animal over the bag, fastening at least some of the restraining means and inflating the bag.

For a better understanding of the present invention some constructional forms will now be described, by way of example, with reference to the accompanying drawings, in which.

Figure 1:
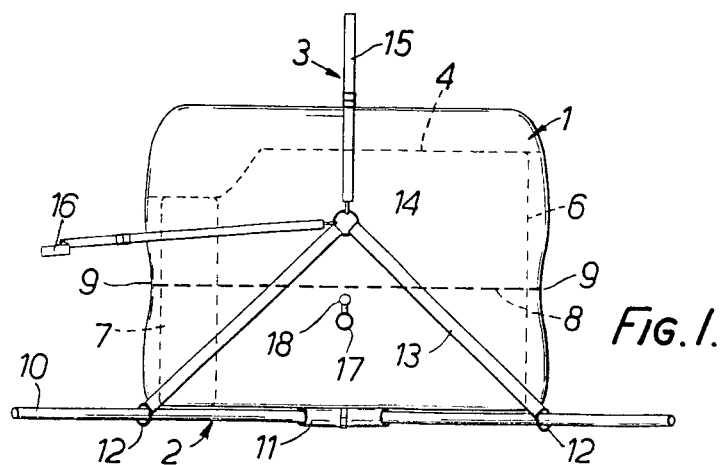
FIG. 1 is a side elevation of a lifting device for animals.
Figure 2:
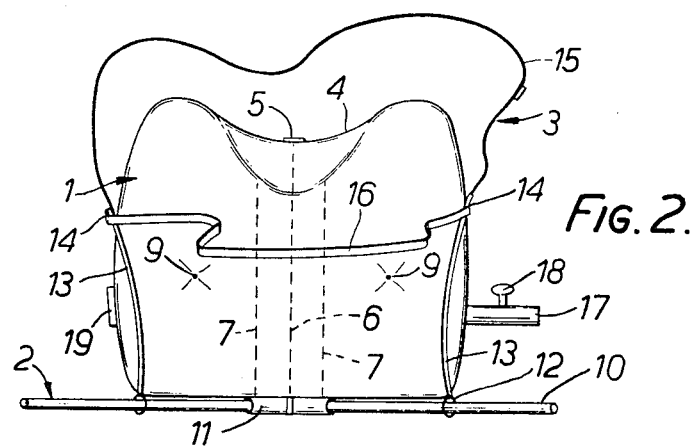
FIG. 2 is an end elevation of the device.
Figure 3:
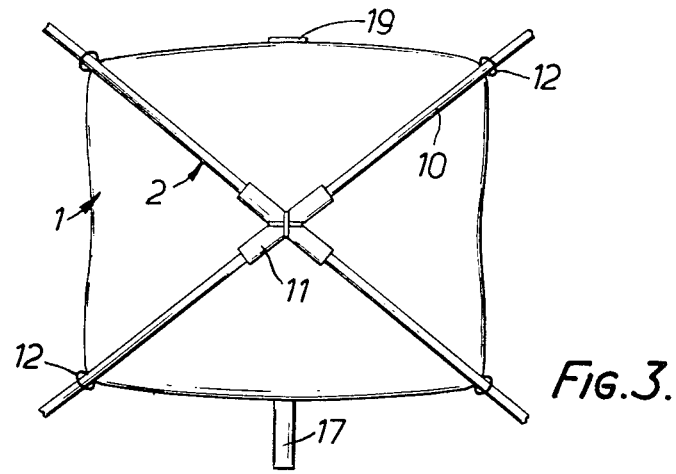
FIG. 3 is an underneath plan view of the device.
Figure 4:
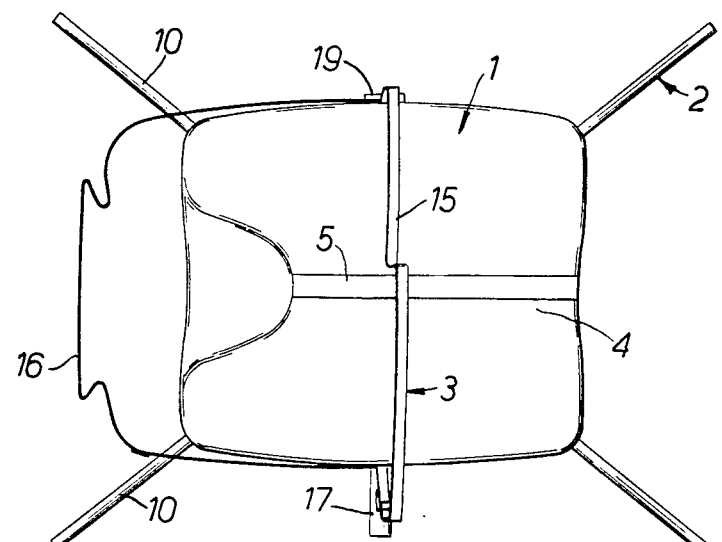
FIG. 4 is a top plan view of the device.

The lifting device of FIGS. 1 to 4 has an inflatable bag 1, a stabilising frame 2, and a harness 3 for strapping over and around a cow. When inflated as shown in the Figures, the bag is of generally rectangular block-like form, but with a depression or valley 4 along the middle of the top. The centre line of this valley is marked by a distinguishing band 5 to help position the cow before inflation. Internally, the bag is spanned by a vertical membrane or reed 6 whose action is to pull down along the band 5 and thus help create the valley 4. There are further short vertical membranes or reeds 7 on either side of the reed 6 at one end where the valley 4 deepens. This is to accommodate the cow's udder. Further internal restraints or ties 8 extend horizontally, one on each side of the reed 6, to create dimples 9 in the ends of the bag which give some freedom for the cow's legs. To allow these ends to bulge would make the cow splay her legs uncomfortably and not allow them to be worked to restore circulation.

The stabilising frame 2 is in the form of a cross with four spokes 10 radiating from a socket member 11 which is tied or otherwise secured centrally of the underside of the bag 1. The sockets point to the four corners, and each spoke can be entered through a ring or loop 12 at the respective corner before being pressed home into the member 11. The spokes 10 remain projecting well beyond the base area of the bag to give it stability, particularly when being inflated. Generally, the spokes may simply have a close sliding fit in the socket member, but they may screw in, have a bayonet type engagement or some other positive attachment.

The rings 12 are at the ends of the arms of inverted V-shaped reinforcements 13 on opposite sides of the bag. These are straps bonded to or incorporated in the bag during manufacture. At the apex, they each have a ring 14 to which the harness 3 is attached. In this example, the harness comprises two straps 15 and 16 each having spring clip attachment to the rings 14, and each being adjustable by a sliding buckle.

On one side of the bag, below the associated ring 14, there is an inlet 17 with an on/off valve 18. At the corresponding point on the opposite side there is a pressure relief valve 19. The bag may be inflated by a power source such as a compressor, a blower similar to that found in vacuum cleaners, or possibly using the exhaust gases from an internal combustion engine. It could also be inflated by hand or foot pump, for the pressure to be attained is only of the order of $20 \times 10^3$ Pa. However, that is a slow process and it is sometimes necessary to help the animal as the bag is inflated. This cannot be done by someone working a pump.

In operation, the stabilising frame 2 is fitted to the deflated bag, which is laid on the ground at a measured distance from the downer cow. The strap 15 to go over the cow's back is attached to the ring 14 nearest the cow and stretched out on the ground towards her. The animal is then rolled over until her belly is over the marker band 5. The strap 15 is brought over her back and fastened to the other ring 14, and inflation is commenced. In the initial stages, the bag is not very stable, and the cow is still lying more sideways than prone. However, sufficient weight is taken by the bag to allow an attendant to ensure that the raising operation proceeds smoothly, simply by leaning or pushing against the cow if she threatens to fall sideways. As the bag approaches full inflation the cow can be helped into an upright position, and eventually all or nearly all her weight will be taken by the bag. The other strap 16 can then be passed round either her rear or fore legs and secured to the rings 14. To help recovery, the attendant may massage or work the cow's legs up and down to restore circulation and strength. At intervals, the bag may be partially deflated to test whether the cow has recovered sufficiently to stand on her own feet. She may do this after just half an hour or so, but in some cases it may be a matter of several hours. Once the cow has recovered sufficiently, the bag can be rapidly deflated, the straps thrown off and the device removed.

The underside of the bag will tend to have a similar depression to that at the top of the bag, since the reed 6 or other ties which may be substituted for it will be in tension and pulling that underside upwards. However, if the socket member 11 is tied closely to the bag, the stabilising frame will counteract this and flatten out the underside to a considerable extent. The extra tensions in the bag caused by this distortion give it enhanced stability. Also, certain variations in the depth and shape of the valley 4 can be made by adjusting the closeness of the socket member 11 to the underside.

There can be many variations in the shape of the bag, its internal construction, the stabilising frame and the harness or other means for restraining the animal.

Instead of an internal reed 6 to help form the valley 4, there may be a strap wholly or partially surrounding the bag and extending along the base of that valley. In order that it should stay in position, it would probably need to be threaded through eyes or some other restraining means on the bag. As the bag is inflated, the restraint to expansion provided locally by the strap will create a similar depression to that caused by the reed 6. The strap may be secured at various lengths and accordingly vary the shape of the depression, the shorter the strap the deeper the valley 4.

Alternatively, instead of the reed 6, there can be one or more vertical tubes with at least one end open to the exterior of the bag, preferably underneath, and with the other end closed and attached to the opposite interior side of the bag. A cord tie is also attached at this end and extends through the tube to the exterior where it can be secured, for example to a cleat on the projecting part of one of the spokes 10. The working length of this tie or these ties can be adjusted to control the depth and shape of the valley 4. In a variation, both tube ends can be open, and a single cord can be threaded up and down through successive tubes.

Such ties can also replace the reeds 7 and the horizontal restraints 8. Indeed, they can be installed wherever some control over the naturally inflated shape is required.

The frame can take many geometrical forms, although variations on the cross described above tend to add to the complexity and expense. One practical possibility, however, is to have a plate which forms a rigid base for the bag, the impermeable flexible material being bonded around the outside of the plate. Extensions to this plate to achieve the required span can be fitted by slot-in rods or the like, following the described example. More complex arrangements may have telescopic or hinged stabilising legs. Also it may be desirable to make the device mobile. For example, it may be necessary to move the cow once she has been raised to her feet, and to put her in a stall. To achieve this, the base frame may have rollers, wheels or castors, which are either removable or lockable when the device is in the correct position.

There can be many modifications of the restraining harness. Instead of a single strap for the fore or hind legs, there can be individual loops for each leg, at or near the corners of the bag. The buckles may be designed to release automatically at a given tension, to avoid injury to the cow, or there may be elasticated or self-regulating straps. Another form of restraint may be a twin horned extension of the bag which inflates and embraces the animal's girth as the bag is inflated. It would meet over the animal's back, where the ends of the horns would be tied together, for example by short straps or lacing. This extension may be a separate bag or compartment so that it can be inflated first to ensure that the animal is made captive before the main bag is inflated. An alternative or even additional inflatable extension may be a collar for the animal's neck, not only to make it captive, but also to provide some measure of head and neck support.

Figure 5:
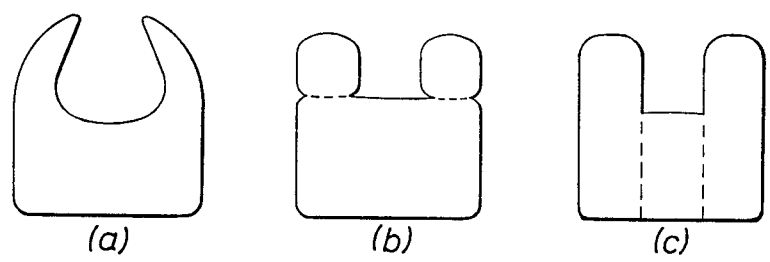
FIG. 5 shows variations of the device.

The bag may take these and many other different forms, some of which are illustrated in FIG. 5. The broken lines indicate internal membranes or reeds, and these may divide the bag into a number of quite separate compartments which can be individually inflated. With suitable valve control, the assumption by the bag of its eventual shape can be done in a controlled manner more easily to raise the animal without extra help. However, such sophistication does lead to a more complex construction, and the provision of more valves and membranes increases the cost considerably.

With a multi-compartmented bag, there may be a single inlet to the compartment designed for the highest pressure. When this is achieved, a relief valve to the next compartment is opened and that fills until it achieves its limiting pressure, whereupon the next relief valve into a third compartment is opened, and so on.

There may be a bag with two quite separate parts; in fact two or more bags joined by sheet material or netting. Thus, in FIG. 5(c) the two taller, outside formations can be separate bags, and the horizontal parts joining them can be sheets or nets. The central compartment is then not an inflatable enclosure in itself. The sheet material, or indeed any surface likely to be in contact with the cow, may be softened by a layer of foamed plastics or rubber.

Although these bags will normally be air filled, other fluids may be used. In particular, the bag may be water filled, and indeed the water could be warmed before being pumped in, and be kept in circulation to maintain a therapeutic temperature. The bag may also be vibrated by pulsing the pumped fluid, as an aid to improving the animal's circulation.

We claim:

1. A lifting device for animals comprising an inflatable bag which, when inflated without a superimposed load, has a depression in its upper face for locating an animal straddling the bag stabilising means including a base, and slide means carried by lower peripheral portions of the bag which slidably anchor the bag to the base, said base having a lateral span substantially greater than the inflated bag.

2. A lifting device as claimed in claim 1, and further comprising restraining means for holding an animal straddling the bag.

3. A lifting device as claimed in claim 2, wherein the restraining means includes a strap for passing over the animal's back when straddling the bag and fastenable to opposite sides of the bag.

4. A lifting device as claimed in claim 2, wherein the restraining means includes a strap for passing around the animal's fore or hind legs when straddling the bag and fastenable to opposite sides of the bag.

5. A lifting device as claimed in claim 4, wherein the restraining means includes a strap for passing over the animal's back when straddling the bag, and a strap for passing around the animal's fore and hind legs when straddling the bag, the straps having common anchorage points on opposite sides of the bag.

6. A lifting device as claimed in claim 5 wherein the base is a frame securable to the underside of the bag and the anchorage points are on bag reinforcements, which also extend to zones where the frame is secured.

7. A lifting device as claimed in claim 6, wherein the bag is of generally rectangular block-like form and wherein the reinforcements are inverted V-shaped straps bonded to or incorporated in opposite sides of the bag, the anchorage points being at the apices and the reinforcements extending to the lower corners.

8. A lifting device as claimed in any one of the preceding claims, wherein the bag is of generally rectangular block-like form.

9. A lifting device as claimed in claim 1, wherein the bag has an internal restraint which exerts a downward pull when the bag is inflated to help create said depression.

10. A lifting device as claimed in claim 1, wherein the bag has an external restraint which locally confines the expansion of the bag to help create said depression.

11. A lifting device as claimed in claim 1, wherein there are internal ties acting generally horizontally to restrain the ends of the bag from bulging.

12. A lifting device as claimed in claim 1, wherein the base has extensions by which its span can be increased.

13. A lifting device as claimed in claim 1, wherein the base has rolling means by which the device, and its load, can be moved laterally.

14. A lifting device as claimed in claim 1 wherein the bag is of generally rectangular block-like form and wherein said base comprises four spokes in the form of a cross, the slide means being at the bottom corners of the bag.

15. A lifting device as claimed in claim 1, wherein one end of the depression is accentuated to accommodate a cow's udder.

16. A lifting device as claimed in claim 15, wherein the formation of this accentuated depression is assisted by internal restraints.

17. A lifting device as claimed in claim 1, wherein the base is a frame securable to the underside of the bag.

18. A lifting device as claimed in claim 17, wherein the frame includes a plurality of elements which fit together and which can be removed for deflation and stowage of the bag.

19. A lifting device as claimed in claim 18, wherein the frame has radial spokes with a common hub with which the spokes engage.

20. A lifting device as claimed in claim 19, wherein the hub is attached to the bag at the centre of the base and the spokes pass through eyes at said lower peripheral points.

21. A lifting device as claimed in claim 1, wherein the base is permanently attached to the bag.

22. A lifting device as claimed in claim 21, wherein the base is a plate to which the bag is bonded.

23. A lifting device as claimed in claim 1, wherein the bag has two or more separately inflatable compartments.

24. A lifting device as claimed in claim 23, wherein the compartments are separated by non-inflatable portions which provide animal support surfaces suspended between inflatable compartments.

25. A lifting device as claimed in claim 23, wherein the compartments are inflatable in sequence.

26. A lifting device as claimed in claim 25, wherein the compartments are interconnected by valves which open at predetermined pressures to admit fluid from one compartment to the next.

27. A lifting device for animals, comprising an inflatable bag which, when inflated without a superimposed load, has a depression in its upper face for locating an animal straddling the bag, stabilizing means including a base movable between an extended operational condition and a compact non-operational condition, and means for anchoring the underside of the bag to the base, the base in said operational condition having a lateral span greater than the bag.

* * * * *